Sept. 8, 1942.                W. R. WICKERHAM                2,295,373
                          SYNCHRONOUS MOTOR CONTROL
                    Filed Jan. 9, 1941            2 Sheets-Sheet 1

WITNESSES:                                        INVENTOR
                                             William R. Wickerham
                                                   BY
                                             Paul E. Friedemann
                                                  ATTORNEY Sept. 8, 1942.  W. R. WICKERHAM  2,295,373
SYNCHRONOUS MOTOR CONTROL
Filed Jan. 9, 1941  2 Sheets-Sheet 2

WITNESSES:
E. A. McCloskey
New C. Groove

INVENTOR
William R. Wickerham.
BY
Paul E. Friedmann
ATTORNEY

Patented Sept. 8, 1942

2,295,373

UNITED STATES PATENT OFFICE 2,295,373

SYNCHRONOUS MOTOR CONTROL

William R. Wickerham, Swissvale, Pa., assignor to Westinghouse Electric & Manufacturing Company, East Pittsburgh, Pa., a corporation of Pennsylvania Application January 9, 1941, Serial No. 373,853

13 Claims. (Cl. 172—289)

My invention relates to motor control systems and more particularly to systems of control for effecting the starting and resynchronizing of a synchronous motor.

One of the important problems in the starting of synchronous motors is to effect synchronization with no, or at least a minimum, line disturbance, a minimum of shock to the load connected to the motor, and to effect maximum pull-in torque.

Numerous attempts have heretofore been made to solve this problem and with some measure of success, however, when the time limit control alone is used, the poorest pull-in torque and the worst line disturbance can not be avoided. On the other hand, when armature current variations alone are used, the pull-in torque may be correct but the line disturbance may be good or may be the worst. In fact, at one starting the severe line disturbance may be had whereas at the next starting, it may be satisfactory. According to probabilities, the starting may be as desired only half the time.

One object of my invention is to provide for maximum pull-in torque and minimum line disturbance for every starting of a synchronous motor.

Another object of my invention is to obtain the advantages of both time-limit starting of a synchronous motor and speed responsive starting of a synchronous motor.

A more specific object of my invention is to synchronize a synchronous motor with maximum pull-in torque when the synchronous motor has made a substantially fixed number of revolutions after having obtained a given speed during acceleration.

Other objects and advantages will become more apparent from a study of the following specification when done in conjunction with the accompanying drawings, in which.

Figure 1:
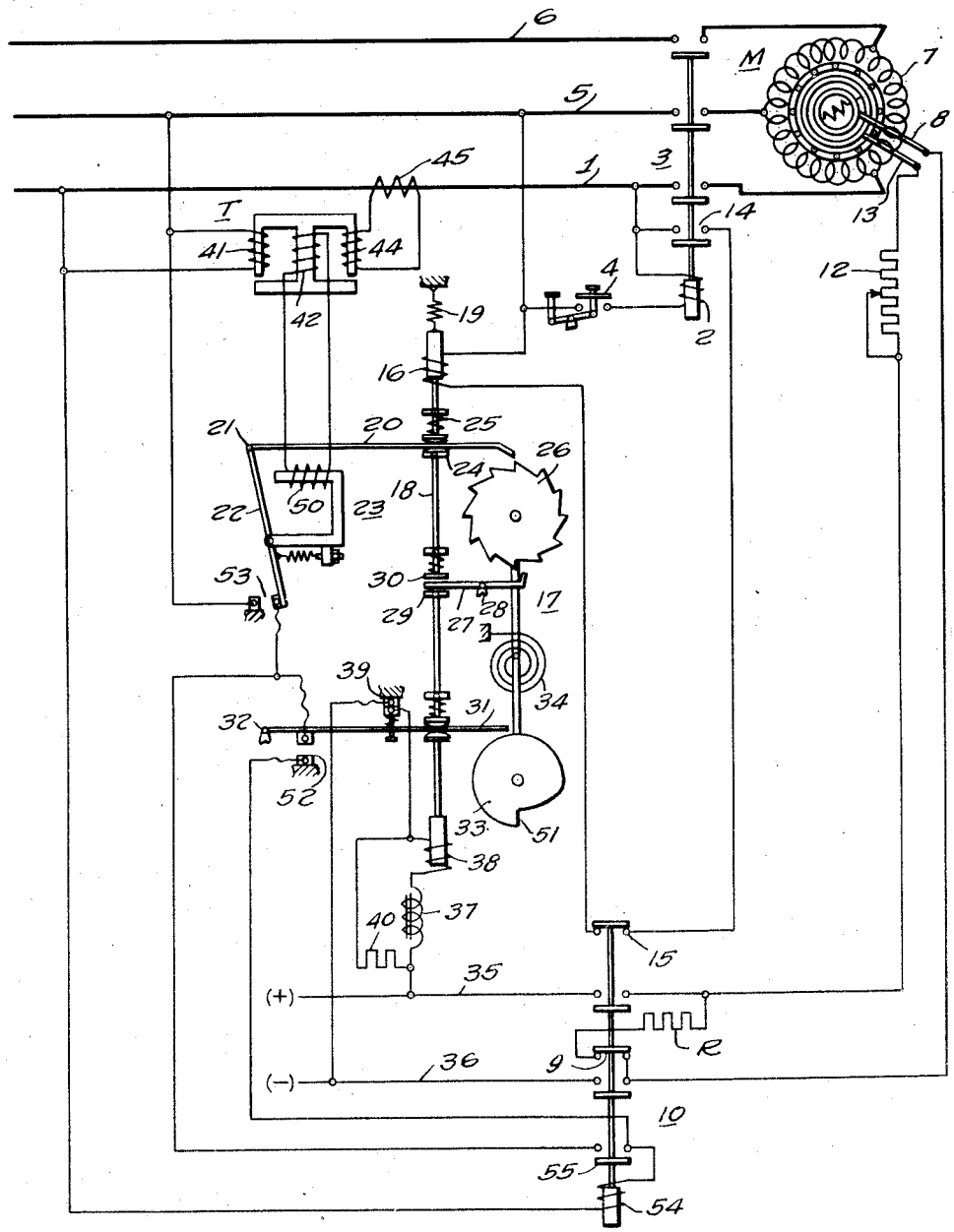
Figure 1 is a diagrammatic showing of my system of control as applied to a synchronous motor.

In Fig. 1, M designates the synchronous motor, which is of conventional design, having an armature winding, a damper, or starting winding, and a field winding. The main switch is designated by 3 and the field switch by 10. The field switch 10 is controlled by the timing relay 17 and the oscillating relay 23, that is, a relay having an armature adapted to vibrate back and forth when energized with alternating current below a given frequency. Both of these relays are controlled by the balancing transformer T.

The timing relay 17 while in a sense measuring time, really counts revolutions when actuated by the vibrating armature of relay 23. The interrelated functions will become clearer as the discussion proceeds.

In fact, the best understanding of my invention can, no doubt, be had from a study of a typical starting sequence. Assuming the attendant, to start the synchronous motor M, depresses the start pushbutton or switch 4, a circuit is then established from bus 1 through coil 2 of the circuit breaker, or line switch 3, switch 4 to bus 5. The contact members of line switch 3 are thus closed to connect the armature, or primary, winding of the motor M to buses 1, 5 and 6.

The motor starts operating as an induction motor on its conventional squirrel cage winding and on its short-circuited field winding 7. The short circuit for the field winding may be traced from slip ring 8 through the back contact members 9 of the field contactor 10, discharge resistor R, rheostat 12, to the slip ring 13.

The operation of the line switch 3 also effects the closing of contact members 14. A circuit is thus immediately established from bus 1 through the contact members 14, the back contact members 15 of the field contactor 10, the actuating coil 16 of timing relay 17, to bus 5. The armature 18 is thus moved down against the action of spring 19. The lever 20, pivoted at 21 on the vibratory armature of relay 23 and slidably disposed between the shoes 24 and 25, thus engages the upper portion of the ratchet wheel 26.

The lever 27, pivoted at 28 and disposed between the shoe 29 and the spring biased shoe 30, engages the lower portion of the ratchet wheel 26. The lever 31, pivoted at 32, is similarly actuated, but engages the cam 33.

The ratchet wheel 26 and the cam 33, being fixedly mounted on the same shaft, thus hold a given relation to each other, and the shaft is held in a given position by the torsion spring 34. If the ratchet wheel 26 is rotated, as will be explained, the torsion spring 34, when the ratchet wheel is released, will move the cam 33 and ratchet wheel 34 back to a first or initial position.

For proper synchronization, buses 35 and 36 are energized. This means that an energizing circuit for armature 18 is also established by a circuit that may be traced from bus 35 through choke coil 37, actuating coil 38, contact members 39 to bus 36. A discharge resistor 40 is provided for choke coil 37 and actuating coil 38, so as to give a time delay to the release of armature 19 when the contact members 39 are opened. The purpose of this will appear presently.

To make the operation of the field switch 10 responsive, at least as one large factor, to the speed of the motor, I provide a balancing transformer T. One of the purposes is to make the equipment operate from the pulsations of the current in the motor primary or armature windings. Before discussing the details of the balancing transformer T, a brief discussion of the theory back of it may not be amiss.

Due to the relatively heavy circulating alternating currents in the damper winding and also due to the circulating alternating current in the field winding, the primary current is subjected to pulsations, twice the slip frequency, impressed on the regular alternating current waves supplied to the armature winding.

Figure 2:
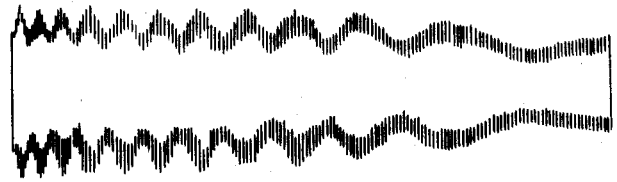
Fig. 2 is an oscillographic showing of the variations in armature current as the slip becomes less and less.

These current pulsations will vary as shown by Fig. 2, which is a copy of an actual record. These pulsations will appear prominently as the speed rises above 90% of synchronous speed. It will be noted at about 6% slip the ratio of crests to valleys of the current envelope is about 22 to 14 and that at approximately 1% slip the ratio is about 18 to 13.

While electromagnetic relays and other devices can be devised that will respond directly to such small variations in ratios, price considerations of such sensitive devices and dependability of operation of them make it impractical to operate a relay directly from these current pulsations, since pick-up and drop-out would have to occur between valleys at 6% and crests at 1%, or with a variation of 14 to 13.

Figure 4:
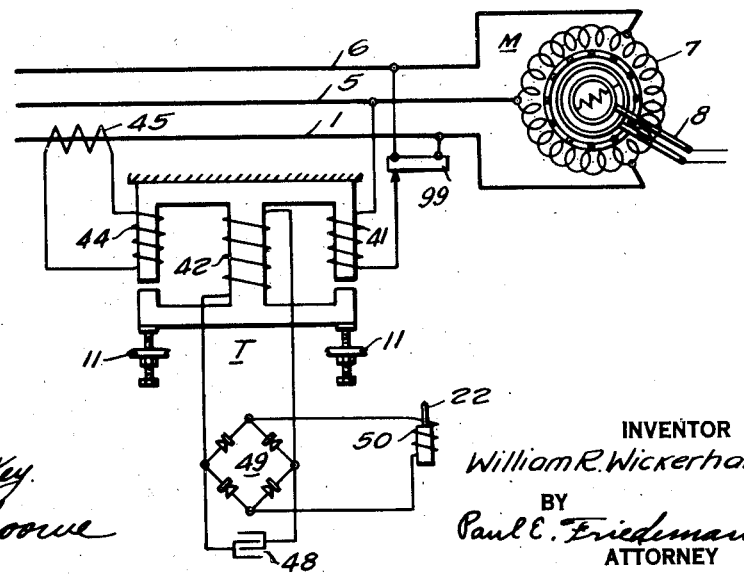
Fig. 4 is a schematic showing of the balancing transformer and the circuits associated with it.

To amplify the current pulsations, I use the balancing transformer shown in Figs. 1 and 4.

In this transformer the winding 41 is connected to the buses 1 and 5, as shown, and will thus tend to produce a constant voltage in the output, or secondary, winding 42. This voltage may be represented by the curve 43, shown in Fig. 3. The winding 44 is connected to the output terminals of the current transformer 45 and will tend to generate a voltage in winding 42 which may be represented by curve 46 in Fig. 3. With similar wave forms, proper polarity and unity power factor in the windings 41 and 44, the net output voltage of the winding 42 may be shown by curve 47 of Fig. 3.

From the curve 47 it will be seen that in the region of 2% slip the transformer is a perfect amplifier so far as pulsations are concerned, that is, a current swing of 2 to 3 has been amplified to zero to any definite value.

Figure 3:
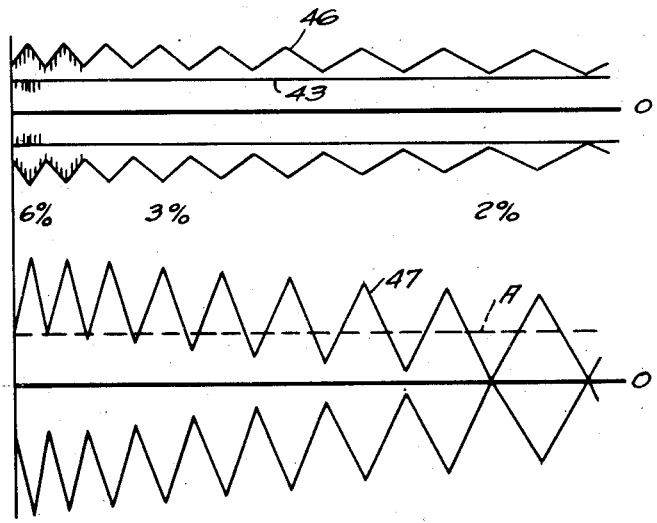
Fig. 3 is a simplified wave form of the armature current variations and also an amplification of such armature current variations as produced by a balancing transformer.

This theory has been proven in the laboratory with an experimental transformer and circuit arrangement as shown in Fig. 4. The results, as shown in Fig. 3, have been produced.

As might be expected, the transformer is sensitive to some extent to changes in power factor between the respective currents in windings 41 and 44. Power factor variations are, however, not so great as to materially alter the conditions illustrated in Fig. 3 when coil 41 has been adjusted to a given phase angle with respect to 44 by device 99. As a matter of fact, a certain variation of power factor between 6% and 1% slip might be used advantageously to equalize the amplitude of 47 between these limits.

I show a condenser 48 in Fig. 4. This condenser, while not absolutely essential, and I have not shown it in Fig. 1, is of value to eliminate high frequency harmonics from the output wave form of winding 42. The rectox 49 is not a necessity and may be omitted, as in Fig. 1, but when used operates for quiet and more efficient operation of the relay magnet or armature 22. The transformer T may have its characteristics adjusted by the air-gap adjusting means 11.

As hereinbefore pointed out, the levers 20, 27 and 31 will be down during starting. When the motor speed attains a speed of over 95% of synchronous speed, the current in coil 50 will have a sufficiently low frequency to cause the armature 22 to vibrate back and forth. In so doing, the lever 20 turns the ratchet wheel clockwise and the lever 27 provides for a progressive clockwise rotation. This means that, only after a definite number of current oscillations have occurred in coil 50, that is, only after a substantially definite time, is cam 33 rotated by an amount sufficient to permit lever 31 to drop down, at ledge 51, to open contact members 39 and close contact members 52.

Since the movement of armature 22, that is, the instantaneous position of this armature, has a definite relation to the position of the pole pieces of the field winding to the rotating flux in the armature, the closure of contact members 53 may be made and is made to take effect when the pole pieces are in the desired position for synchronization of the motor, taking in account, of course, the time lag between the closure of contact members 53 and the time the field builds up after closure of switch 10.

The first instant after the contact members 52 close that conditions are right for maximum pull-in torque, contact members 53 close. A circuit is immediately established from bus 1, through coil 54 of the field switch 10, and contact members 52 and 53 to bus 5.

The field 7 is thus connected to buses 35 and 36 and a moment later is disconnected from the discharge resistor R. Immediately upon synchronization of the motor, the vibrations of armature 22 cease and contact members 53 remain closed. The field switch is now held in by the circuit through contact members 55 and 53.

Since the field switch opens the contact members 15, coil 16 is deenergized. Coil 38, due to its time lag circuit, through contact members 39 opened a short instant ahead of contact members 15, holds the levers 20, 27 and 31 down for two to three seconds. After this lapse of time, spring 34 repositions the cam 33 and ratchet wheel 26.

In the event of unusual line current fluctuations which cause pull-out, coil 50 will release armature 22 to thus effect opening of the field switch. Resynchronization then proceeds exactly in accordance with the starting sequence discussed.

My system of control has many advantages, as generally pointed out in the objects and elsewhere, and as an important feature provides that the synchronization does not take place before a certain high speed has been reached, a time has elapsed after such high speed has been obtained, and the pole pieces are in proper position with reference to the rotating flux to get maximum pull-in torque.

I am, of course, aware that others, particularly after having had the benefit of my teachings, may devise other similar synchronous motor starting control. I, therefore, do not wish to be limited to the particular showing made but only by the scope of the claims hereto appended.

I claim as my invention:

1. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; switching means for connecting the field winding to the source of direct current to synchronize said synchronous motor; a frequency relay having an armature disposed to oscillate when said relay is energized by currents having a frequency less than a given frequency, a balancing transformer connected to produce currents having a frequency equal to the slip frequency of the motor, said relay being connected to be energized by said transformer and thus adapted to begin oscillating its armature at a given slip frequency, a switch connected to said relay armature and thus operable by the relay and adapted to close at an instant when a selected phase displacement exists between the transformer output voltage and the source of supply, a timing relay operated by the oscillating armature of the frequency relay, a switch operated to closed position by the timing relay a substantially definite time interval after the relay begins to oscillate, and means responsive to the first simultaneous closed position of the switch operated by the oscillating armature of the frequency relay and the switch of the timing relay for causing the operation of the switching means for connecting the field winding to the source of direct current.

2. In a starting system for a synchronous motor, in combination, a synchronous motor having an armature winding, a field winding, and a starting winding, a source of alternating-current; switching means for connecting the armature winding to the source of alternating current to thus start the motor as an induction motor on the starting winding; a source of direct current, switching means for connecting the field winding to the source of direct current to excite said synchronous motor; means responsive to modulations of the current in the armature winding for counting revolutions, a switch operated to close after said last-named means has counted a given number of revolutions, a second switch operated to close when a given phase relation exists between the modulations in the armature current and the alternating-current supply, and means responsive to the simultaneous closure of the two last-named switches adapted to effect operation of the switching means for connecting the field winding to the source of direct current.

3. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; switching means for connecting the field winding to the source of direct current to synchronize said synchronous motor; a balancing transformer connected in the supply of the armature winding and adapted to produce an amplified effect of the modulation frequencies of the current in the armature winding, frequency responsive control means connected to said transformer and responsive to a certain frequency of the amplified modulation frequencies of the current in the armature windings, said last-named means having a switch disposed to close when a certain phase relation exists between the modulations and the alternating current in the armature, and a switch operable by said frequency responsive control means and thus adapted to close a substantially definite time after said control means begins to operate, and means responsive to the closure of both said last-named switches for operating said switching means for said field winding.

4. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; switching means for connecting the field winding to the source of direct current to excite said synchronous motor; and control means, having elements successively operable after a predetermined frequency of the current modulations is attained, a given number of motor revolutions, and the existence of a certain phase relation between the supply frequency and the modulation frequency, adapted to effect the operation of the switching means for connecting the field winding to the source of direct current.

5. A control system for starting a synchronous motor, in combination, a synchronous motor having a stator or armature winding and a field winding, starting connections for the field winding for causing modulations in the armature current, and running connections for the field winding for exciting the motor, and means, including elements successively responsive to modulations in the armature current of a given frequency, a predetermined number of motor revolutions after the operation of the elements responsive to modulations in the armature current of a given frequency, and the existence of a given phase relation between the frequency of the modulations of the armature current and the alternating-current frequency in the armature winding, for controlling the circuit arrangement of the starting and running connections of the field winding.

6. In a starting system for an alternating-current motor, in combination, an alternating-current motor, a stator winding, a rotor winding including a damper winding and a field winding, starting and running connections for said field winding, a source of direct current, a source of alternating current having a given frequency, means for connecting the stator winding to said source of alternating current, means for inducing currents proportional to the slip-frequencies in the stator, means for amplifying said induced currents, and control means, responsive successively to a given slip frequency, a given number of motor revolutions, and the existence of a given phase relation of the slip frequency and the alternating current, for changing the field winding from the starting connection to the running connection in circuit with said source of direct current.

7. In a system of control for a synchronous motor, in combination, a synchronous motor, having armature windings, field windings, and damper windings, a source of alternating current, means for connecting the armature winding to the source of alternating current, a source of direct current, field switching means for connecting the field winding to the source of direct current, relay means including, a switch operable when a given phase relation exists between the rotating flux in the armature winding and the field windings, a switch operable in response to a given number of motor revolutions, and means responsive to a given speed of the motor for setting said relay means in operation, and means responsive to the simultaneous positioning of the switches of the relay means to a given position for actuating the field switching means.

8. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during starting of said synchronous motor producing modulations in the armature current having a frequency proportional to the slip speed of the motor; a balancing transformer connected to the stator winding producing amplified output currents having a frequency proportional to the slip speed of said synchronous motor; a relay, having an actuating coil connected to the said balancing transformer, and having an armature, said relay being designed to begin oscillating its armature when the frequency of the output currents of the transformer have decreased to a given value and to move its armature in a definite phase relation to the phases of the alternating current supplied to the stator winding; means for counting motor revolutions set in operation by the oscillations of the armature of said relay; a switch operated to closed position when a predetermined number of motor revolutions have been counted by the means for counting motor revolutions; a switch operated by the relay armature and thus adapted to close each time when the alternating output current of the transformer holds a given phase relation to the alternating current supplied to the stator; and circuit means including the switch actuated by the relay armature and the switch actuated by the motor revolution counting means adapted to actuate said field switching means when said switches are simultaneously closed.

9. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during starting of said synchronous motor producing modulations in the armature current having a frequency proportional to the slip speed of the motor; a balancing transformer connected to the stator winding producing amplified output currents having a frequency proportional to the slip speed of said synchronous motor; a relay, having an actuating coil connected to the output currents of the said balancing transformer, said relay being designed to begin oscillating its armature when the frequency of the output currents of the transformer have decreased to a given value and to move its armature in a definite phase relation to the phases of the alternating current supplied to the stator winding; means for counting motor revolutions set in operation by the oscillations of the armature of said relay; a switch operated to closed position when a predetermined number of motor revolutions have been counted by the means for counting motor revolutions; a switch operated by the relay armature and thus adapted to close each time when the alternating output current of the transformer holds a given phase relation to the alternating current supplied to the stator; circuit means including the switch actuated by the relay armature and the switch actuated by the motor revolution counting means adapted to actuate said field switching means when said switches are simultaneously closed, and means for setting the revolution counting means to its original position a definite time after the operation of the field switching means.

10. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during the starting of said synchronous motor producing modulations in the armature current having a frequency proportional to the slip speed of the motor; means for producing an output current having a frequency proportional to the slip speed of the motor; a relay energized by said output current and having an armature adapted to oscillate and a switch on the armature adapted to close each time when the output currents hold a given phase relation to the alternating currents supplied to the stator and the frequency of the output currents has decreased to a given value; revolution counting means set in operation by the relay when the frequency of the output currents is a given value; a switch closed by the revolution counting means when a certain number of revolutions have been counted; and means for actuating the field switching means when both switches are simultaneously closed.

11. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during starting of said synchronous motor producing modulations in the armature current having a frequency proportional to the slip speed of the motor; means for producing an amplified output current having a frequency proportional to the slip speed of the motor; a relay energized by said amplified output current and having an armature adapted to oscillate and a switch on the armature adapted to close each time when the amplified output currents hold a given phase relation to the alternating currents supplied to the stator and the frequency of the output currents has decreased to a given value; revolution counting means set in operation by the relay when the frequency of the output currents is a given value; a switch closed by the revolution counting means when a certain number of revolutions have been counted; means for actuating the field switching means when both switches are simultaneously closed, and means for setting the revolution counting means to its original position a definite time after the operation of the field switching means.

12. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during starting of said synchronous motor producing modulations in the armature current having a frequency proportional to the slip speed of the motor; means responsive to a given low frequency of the said current modulations; revolution counting means set in operation by said last named means; a switch so coupled to said means responsive to a given low frequency of said current modulations as to close each time there is a given phase relation between the current modulations and the alternating current supply; a switch on the revolution counting means closed after a certain number of revolutions; and means for actuating the field switching means when both said switches are closed at the same time.

13. In a starting system for a synchronous motor, in combination, a synchronous motor having an armature winding, a field winding, and a starting winding; a source of alternating current; switching means for connecting the armature winding to the source of alternating current to thus start the motor as an induction motor on the starting winding; a source of direct current; field switching means for connecting the field winding to the source of direct current to excite said synchronous motor and thus synchronize said synchronous motor; the currents induced in the starting winding during starting of said synchronous motor producing modulations in the armature current having a frequency proportional to the slip speed of the motor; means responsive to a given low frequency of the said current modulations; revolution counting means set in operation by said last named means; a switch so coupled to said means responsive to a given low frequency of the said current modulations as to close each time there is a given phase relation between the current modulations and the alternating current supply; a switch on the revolution counting means closed after a certain number of revolutions; means for actuating the field switching means when both said switches are closed at the same time, and means for setting the revolution counting means to its original position a definite time after the operation of the field switching means.

WILLIAM R. WICKERHAM.